US012775100B1

(12) United States Patent
Anschuetz

(10) Patent No.: US 12,775,100 B1
(45) Date of Patent: Oct. 27, 2026

(54) VEHICLE SYSTEMS AND METHODS FOR DETECTING AN ENCLOSURE

(71) Applicant: Navico Group Americas LLC, Menomonee Falls, WI (US)

(72) Inventor: Steven M. Anschuetz, Kalamazoo, MI (US)

(73) Assignee: Navico Group Americas LLC, Menomonee Falls, WI (US)

(*) Notice: Subject to any disclaimer, the term of this patent is extended or adjusted under 35 U.S.C. 154(b) by 14 days.

(21) Appl. No.: 18/795,837

(22) Filed: Aug. 6, 2024

(51) Int. Cl.
*G01S 19/23* (2010.01)
*G01S 19/14* (2010.01)

(52) U.S. Cl.
CPC ............ *G01S 19/235* (2013.01); *G01S 19/14* (2013.01)

(58) Field of Classification Search
None
See application file for complete search history.

(56) References Cited

U.S. PATENT DOCUMENTS

| | | | | |
|---|---|---|---|---|
| 8,725,329 | B1 * | 5/2014 | Snyder | B63H 20/14 440/6 |
| 9,533,747 | B2 * | 1/2017 | Arbuckle | B63H 21/20 |
| 10,920,401 | B2 * | 2/2021 | O'Donnell | E02F 9/205 |
| 12,037,953 | B2 * | 7/2024 | Gonring | F02D 29/02 |
| 2022/0014036 | A1 * | 1/2022 | Gonring | B63J 3/02 |
| 2022/0283551 | A1 * | 9/2022 | Atmatzakis | H01Q 5/321 |
| 2025/0299572 | A1 * | 9/2025 | Johnson | G05D 1/617 |

FOREIGN PATENT DOCUMENTS

| | | | | |
|---|---|---|---|---|
| CN | 101399998 A * | 4/2009 | | G01S 19/14 |
| KR | 20140134010 A * | 11/2014 | | G01S 11/04 |
| WO | WO-2024078265 A1 * | 4/2024 | | G01C 21/3804 |

* cited by examiner

*Primary Examiner* — Fekadeselassie Girma
(74) *Attorney, Agent, or Firm* — Andrus Intellectual Property Law, LLP

(57) ABSTRACT

A method of detecting that a vehicle is under an enclosure includes operating a global positioning receiver on a vehicle to receive a global positioning signal from one or more satellites, identifying a signal quality value of the global positioning signal, comparing the signal quality value to a signal quality threshold, and determining whether the vehicle is under an enclosure based on the comparison.

20 Claims, 4 Drawing Sheets

VEHICLE SYSTEMS AND METHODS FOR DETECTING AN ENCLOSURE

FIELD

The present disclosure relates to systems and methods for vehicles, and more particularly to systems and methods for detecting that a vehicle is under an enclosure.

BACKGROUND

Each of the below U.S. Patents and Applications is hereby incorporated herein by reference.

U.S. Pat. No. 8,725,329 discloses systems and methods for controlling a hybrid propulsion system for a marine vessel. A control circuit controls an electric motor-generator according to at least two modes, including a first mode wherein the electric motor-generator receives power from a battery and rotates a driveshaft to drive a propulsor and a second mode wherein the electric motor-generator generates power to charge the battery based upon torque from an internal combustion engine. A time criterion and at least one user-desired operational characteristic of at least one of the internal combustion engine, electric motor-generator, and battery are input to the control circuit. Based on the time criteria and user-desired operational characteristic, the control circuit calculates a schedule for at least one of charging the battery with the electric motor-generator and discharging the battery to a house load of the marine vessel. The control circuit further controls operation of the electric motor-generator according to the schedule.

U.S. Pat. No. 9,533,747 discloses a hybrid propulsion system has an internal combustion engine and an electric motor that each selectively powers a marine propulsor to propel a marine vessel. A plurality of batteries discharges current to power the motor. A controller is programmed to aggregate the recharge and/or discharge limits of plurality of batteries and then operate the system according to a method that preferably prevents internal fault and disconnection of batteries in the plurality.

U.S. Pat. No. 12,037,953 discloses a marine propulsion system for a marine vessel includes an engine effectuating rotation of an output shaft, multiple batteries configured to power a marine vessel load, and an alternator having a rotor that is driven into rotation by the output shaft and that outputs a charge current to the batteries. The marine propulsion system further includes a control system configured to operate the engine in a propulsion mode and a generator mode. Upon receiving a generator mode command to start the engine in the generator mode, the control system operates the engine in accordance with a set of generator parameters to charge the batteries while a shift system of the marine propulsion system is locked in a neutral position such that the propulsor cannot be engaged and the marine vessel remains stationary.

U.S. Publication No. 2022/0014036 discloses a marine AC generator system that includes a marine generator driven by an internal combustion engine and configured to generate an AC current and a rectifier configured to rectify the AC current to provide a DC current. At least one battery is configured to receive and be charged by the DC current. A battery powered inverter is configured to be powered by the at least one battery and to generate a variable current output frequency such that an AC electrical power is provided to a load when the marine generator is not running U.S. application Ser. No. 18/082,323 discloses a marine propulsion system for a marine vessel. The system includes an engine effectuating rotation of an output shaft; at least one battery configured to power a load; an alternator having a rotor that is driven into rotation by the output shaft and that outputs a charge current to at least one battery; and a control system configured to operate the engine in a propulsion mode to rotate a propulsor to propel the marine vessel and a generator mode to charge the at least one battery while the marine vessel remains stationary. The control system is further configured to receive a generator mode command to start the engine in the generator mode; determine whether at least one generator start condition is satisfied; and responsive to a determination that at least one generator start condition is satisfied, operate the engine in the generator mode.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the present disclosure, a method of detecting that a vehicle is under an enclosure includes operating a global positioning receiver on a vehicle to receive a global positioning signal from one or more satellites, identifying a signal quality value of the global positioning signal, comparing the signal quality value to a signal quality threshold, and determining whether the vehicle is under an enclosure based on the comparison.

In one embodiment, the method further includes determining that the vehicle is under the enclosure if the signal quality is less than the signal quality threshold.

In another embodiment, the signal quality value is based on at least one of a number of satellites from which the global positioning signal is received and/or a signal strength characteristic of the global positioning signal, and wherein the signal quality threshold is a threshold number of satellites and/or a threshold signal strength characteristic.

In another embodiment, the method further includes comparing a number of satellites from which the global positioning signal is received to a threshold number of satellites.

In another embodiment, the method further includes comparing a signal strength characteristic of the global positioning signal to a threshold signal strength characteristic.

In another embodiment, the signal strength characteristic is based on a plurality of global positioning signals received from a plurality of satellites.

In another embodiment, the signal quality threshold is a fixed value.

In another embodiment, the signal quality threshold is a calibrated value calibrated for a region where the vehicle is located.

In another aspect of the present disclosure, a system for controlling an engine on a vehicle includes a global positioning receiver on the vehicle configured to receive a global positioning signal from one or more satellites and output at least one signal quality indicator, and a control system. The control system is configured to identify a signal quality value of the global positioning signal based on the at least one signal quality indicator, compare the signal quality value to a signal quality threshold, determine whether the vehicle is under an enclosure based on the comparison, and control the engine based on whether the vehicle is under the enclosure.

In one embodiment, the control system is further configured to determine that the vehicle is under the enclosure if the signal quality is less than the signal quality threshold.

In another embodiment, the control system is further configured to control the engine such that the engine is not started when the vehicle is under the enclosure.

In another embodiment, the vehicle is a marine vessel and the engine is a generator configured to charge at least one energy storage device on the marine vessel, wherein the control system is configured to start the generator to charge the power storage device only if the marine vessel is not under the enclosure.

In another embodiment, the signal quality indicator includes a number of satellites from which the signal is received and/or at least one signal strength characteristic of the global positioning signal.

In another embodiment, the signal quality threshold is a threshold number of satellites and/or a threshold signal strength characteristic.

In another embodiment, the signal quality threshold is a threshold number of satellites with at least a threshold signal strength characteristic.

In another aspect of the present disclosure, a method for controlling an engine on a vehicle includes operating a global positioning receiver on a vehicle to receive a global positioning signal from one or more satellites, identifying a signal quality value of the global positioning signal, comparing the signal quality value to a signal quality threshold, determining that the vehicle is under an enclosure if the signal quality is less than the signal quality threshold, and controlling the engine such that the engine is not started when the vehicle is under the enclosure.

In one embodiment, the vehicle is a marine vessel and the engine is a generator configured to charge at least one energy storage device on the marine vessel. The method further includes determining that a charge level of the at least one storage device is less than a threshold charge level, and in response to determining that the marine vessel is not under the enclosure based on the signal quality not being less than the signal quality threshold, start the generator to charge the energy storage device.

In another embodiment, the signal quality value is based on at least one of a number of satellites from which the global positioning signal is received and/or a signal strength characteristic of the global positioning signal, and the signal quality threshold is a threshold number of satellites and/or a threshold signal strength characteristic.

In another embodiment, the method further includes comparing the number of satellites from which the global positioning signal is received to the threshold number of satellites.

In another embodiment, the method further includes comparing the signal strength characteristic of the global positioning signal to the threshold signal strength characteristic, wherein the signal strength characteristic is based on a plurality of global positioning signals received from a plurality of satellites.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
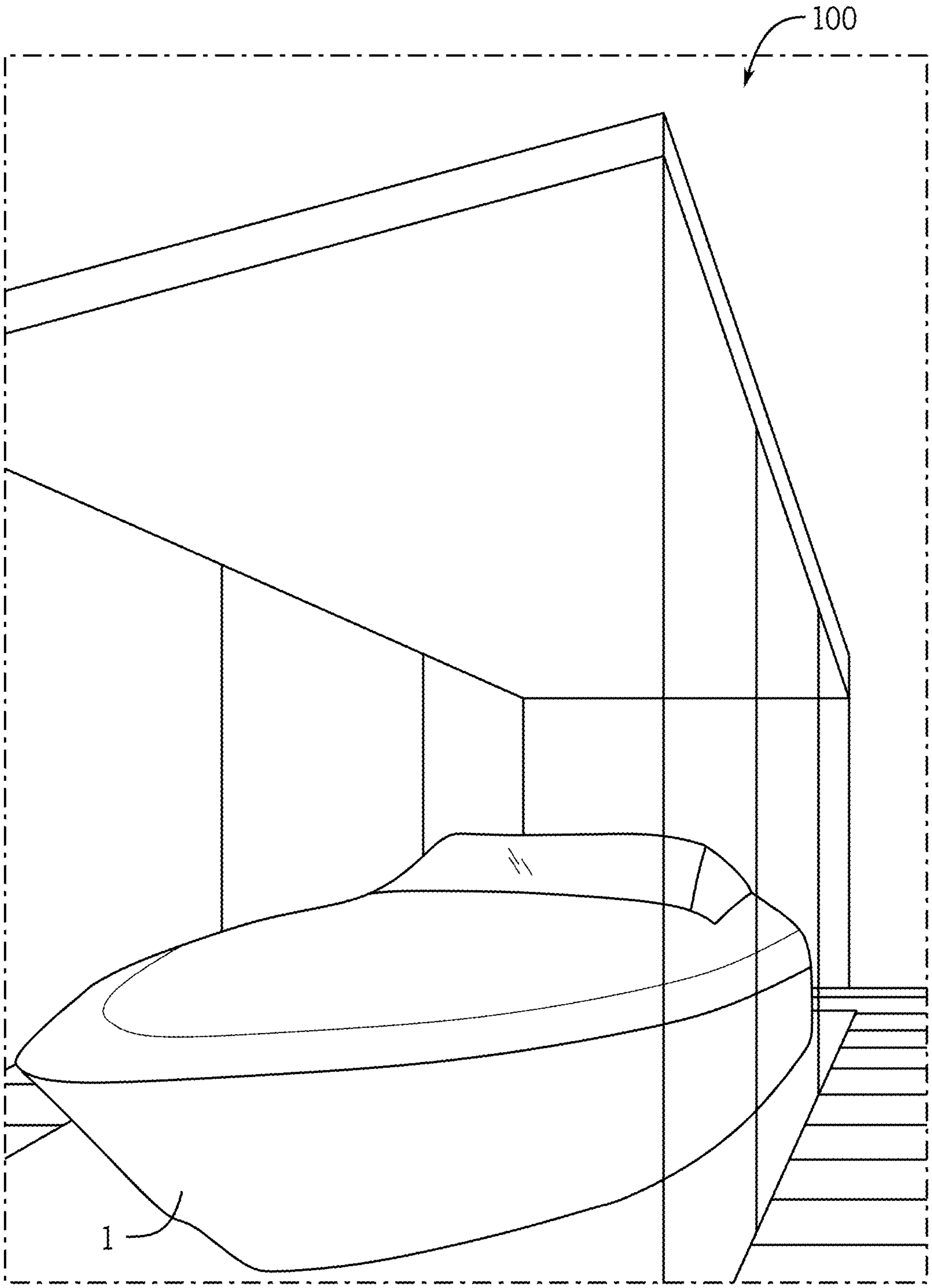
FIG. 1 illustrates one example of a vehicle under an enclosure according to exemplary embodiments of the present disclosure.

In the present description, certain terms have been used for brevity, clarity and understanding. No unnecessary limitations are to be inferred therefrom beyond the requirement of the prior art because such terms are used for descriptive purposes only and are intended to be broadly construed.

The present disclosure relates to systems and methods for determining whether a vehicle is under an enclosure, such as for purposes of controlling an engine or other devices or subsystems on the vehicle. The inventors have recognized that it is desirable to know when the vehicle is under an enclosure so that devices and subsystems on the vehicle can be controlled appropriately, such as to determine whether a vehicle's engine(s) can be safely operated for extended periods of time. The inventors have further recognized that it is important to ensure that the vehicle is not in an enclosed space, such as under a roof, before autonomously starting the engines to reduce potential exposure to exhaust gases, such as carbon monoxide (CO). In one embodiment, the engine(s) may be started autonomously to act as generator(s) to charge one or more batteries on the vehicle and/or to provide power to loads on the vehicle, such as a marine vessel or RV having on-board accessories (e.g., air conditioning, refrigerator, water heater, electric pumps, etc.) that need to be powered. The disclosed systems and methods may be employed to determine whether the vehicle is under or in an enclosure, wherein determining that the vehicle is not in an enclosure is a precondition to automatically starting the engine(s).

Additionally or alternatively, other devices and systems may be dependent on an open environment and/or may operate differently when under an enclosure, and thus the GPS-based determination of whether the vehicle is under an enclosure may be used to inform operation of other systems. For example, being under an enclosure may skew sensor data, such as magnetometer readings, and thus the control system may be configured to account for such inaccuracies in its reliance on the sensor data. As another example, the system may also be configured to control extension of extendable devices on the vessel or other vehicle, such as antennas, bimini tops, sun shades, satellite receivers, etc. The system may be configured to control one or more actuators on the vessel to ensure that extendable devices are not extended, such as to make sure that the extendable devices in a collapsed position or otherwise not actuated to be further extended, when the vehicle is under an enclosure. [

The inventor has developed new systems and methods for detecting that a vehicle is under an enclosure. The disclosed systems and methods are applicable to and may be adapted for multiple types of vehicles that may intermittently be located in an enclosure and containing devices or systems that may be impacted or controlled differently when enclosed, including marine vessels, RVs, specialty vehicles, automobiles, heavy-duty trucks, and the like. As disclosed in more detail below, the method and system are configured to operate a global positioning receiver on a vehicle to receive a global positioning signal from one or more satellites, identify a signal quality value of the global positioning signal, compare the signal quality value to a signal quality threshold, and then determine whether the vehicle is under an enclosure based on the comparison. In some embodiments, the systems and methods include controlling one or more engines on a vehicle based on the determination to avoid autonomously starting and/or continued operation of the engine(s) for a period of time when the vehicle is under the enclosure.

Referring now to FIG. 1, a vehicle 1, which here is a marine vessel, positioned under an exemplary enclosure 100. For a marine vessel, the enclosure could be, for example, a covered slip, boat house, indoor storage facility, or other covered location where the vessel is parked. The enclosure may be fully enclosed or partially enclosed, wherein the system is configured to detect enclosures that impede GPS signals—i.e., to use the impeded GPS signals as a way of detecting or determining that the vessel is under an enclosure. Other types of vehicles may be located in different types of enclosures, and GPS may similarly be used to detect that the vehicle is located under or in an enclosure. For recreational vehicles or automobiles or other types of vehicles, the enclosure may be a garage, car port, covered storage facility, or other enclosure under which the RV or other type of vehicle is parked.

The vehicle includes a global positioning system (GPS) comprising a global positioning receiver configured to receive a global positioning signal from one or more satellites. The global positioning signal received will be degraded by coverage over the GPS receiver, and thus by coverage over the vessel, and thus will be impacted when the vessel (or other vehicle) is under an enclosure. Thus, the inventor has recognized that the global positioning signal can be used as an indicator for detecting whether the vessel (or other vehicle) is under an enclosure. Accordingly, the disclosed control system is configured to identify one or more signal quality values of the global positioning signal and compares the signal quality value(s) to signal quality threshold(s). The control system uses this comparison to determine whether the vehicle is under an enclosure. The global positioning signal may be more significantly degraded by enclosures with sides and/or by enclosures impeding signals across all or most angles above the vessel because more of the satellite signals will be impacted. Signals from satellites closer to the horizon may be weaker than signals from satellites overhead, and thus large roofs and/or enclosures with sides may completely block signals from satellites close to the horizon, whereas signals from satellites overhead may be weakened by still detectable. Further, the GPS signal may be degraded differently based on the material of the enclosure, where canvas or other air-permeable materials may also be more permeable to GPS signals.

The global positioning receiver may be configured to receive global positioning signals from one or more satellites in any type of global positioning system (all referred to herein as global positioning system and the acronym GPS), such as Navstar GPS, GLONASS, GNSS, SLR, BeiDou, Galileo, and Satnav, as non-limiting examples. The global positioning receiver receives a global positioning signal from at least four satellites. The global positioning receiver includes an antenna configured to receive signal from a plurality of satellites (e.g., Standard Positioning Service satellites) and a receiver-processor unit configured to convert the radio signal to a useable navigation solution. This will output positioning information, as well as information regarding the number of satellites it receives signal from, the IDs of said satellites, and/or the signal strength of the received signals. Output from the global positioning receiver may include signal quality indicators such as identification of which satellites the receiver received signal from, each connected satellite ID, signal strength, average signal strength, and how many satellites are detected.

The signal quality indicators are received by the control system and, from that information, the control system determines a signal quality value. The signal quality value may be any value tied to the strength and/or number of satellite signals received, which will degrade significantly when the vehicle is under an enclosure. A signal quality value may include one or more parameters, such as the number of satellites or a signal strength characteristic, such as a signal strength of each received satellite signal, or signal strength(s) of some subset of the received satellite signals—e.g., the maximum signal strength received, the top four signal strength values (or some other predetermined number), an average or mean of the signal strengths or subset of the signal strengths, a filtered signal strength over a predetermined period of time (e.g., an averaging filter), or something similar. Alternatively or additionally, the signal quality value may be a combination of parameters, such as a number of satellites from which at least a threshold signal strength is received.

The signal quality value is compared to a signal quality threshold to detect that the vehicle is under an enclosure, such as a threshold signal strength characteristic and/or a threshold number of satellites from which a signal is received, or some combination thereof—e.g., a threshold number of satellites providing at least a threshold signal strength. The value type of the signal quality threshold corresponds to the value type of the signal quality value and is configured to enable detection that the GPS signal is degraded by an amount indicating that the vehicle is under an enclosure. The signal quality threshold is set low enough that it can detect when the vessel is under an enclosure that impacts operations (such as that impacts the safety of running the engine for an extended period), but not so low that it interferes with automatic operation of the engine(s) or other vehicle systems when the vehicle is not under an enclosure. Different numbers of GPS satellites are detectable at different geographic locations and, for any given location, the number and identity of detectable satellites will vary based on time of day and cloud cover. The GPS signal may be degraded by any coverage, including cloud coverage or weather, and/or by adjacent structures that are a sufficient height and size (e.g., an adjacent cliff edge or by adjacent buildings in an urban environment). Additionally, degradation of the GPS signal may vary depending on materials and size of an enclosure. Thuse, the signal quality threshold may be set to accommodate for these various factors, or to favor certain factors or priorities over others, to improve safety while not unnecessarily impeding operations of autonomous vehicle systems (such as automatically starting generator(s) to charge a battery). In some embodiments, the system may be configured to automatically adjust the signal quality threshold based on location, weather, or other factors at any given time, or the signal quality threshold may be user-configurable to adapt to a typical situation for a particular vehicle.

The signal quality threshold may be a fixed value, a user selectable value, or a configurable value configurable. In one embodiment, the signal quality threshold is a static, global threshold employed for all locations, times of day, etc. In another embodiment, the signal quality threshold may be a regional threshold, wherein the regional threshold may be location and/or time dependent. With a regional threshold, the control system may be configured to determine how many satellites should be detected and/or an expected signal strength at a given time of day in a given region where the vehicle is located. The location used for a regional threshold may be, for example, a last determined GPS position or a preset default position, such as a "home" position established as a system configuration.

Alternatively or additionally, the signal quality threshold may be set based on user input or configuration input, such as selection of an enclosure type and/or materials where the vehicle is typically housed—e.g., as "open-sided enclosure with a metal roof" or "wooden boat house". The system may be configured to automatically select a signal quality threshold from a plurality of potential values based the user input, such as based on a lookup table or other data structure associating threshold signal strength characteristic values and/or threshold number of satellite values to certain user inputs, such as selectable enclosure types, geographic regions, etc.

Figure 2:
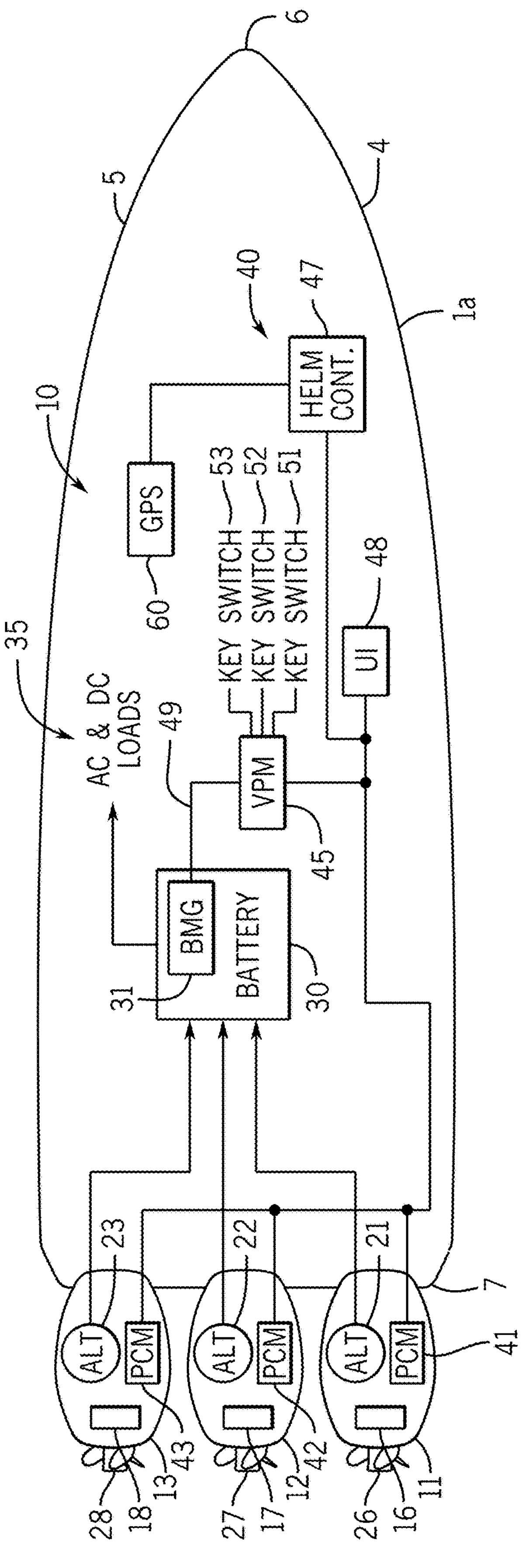
FIG. 2 is a schematic view of an exemplary control system on a marine vessel in accordance with the present disclosure.

FIG. 2 depicts an embodiment of a vehicle being a marine vessel 1*a* having a marine drive system 10 comprising a plurality of marine drives configured to selectively operate in a propulsion mode and in a generator mode. The marine vessel 1*a* has starboard side 4, a port side 5, a bow 6 at the front, and stern 7 at the back. In the depicted embodiment, the vessel 1*a* is equipped with three marine drives 11-13, which are outboard marine drives mounted on the stern 7 and include a starboard marine drive 11, center marine drive 12, and port marine drive 13. In various embodiments, the marine drives 11-13 may be outboard drives, inboard drives, inboard/outboards or stern drives, jet drives, etc.

Each marine drive 11-13 includes an engine 16-18 configured to effectuate rotation of an output shaft that can be used to drive a propulsor 26-28, such as a propeller or impeller, and to drive a respective alternator 21-23. Each alternator 21-23 includes a rotor driven into rotation by the output shaft to generate a charge current to charge the energy storage device 30. Each of the marine drives 11-13 is configured to operate in a propulsion mode in which each of the respective engines 16-18 are operated to rotate the propulsor 26-28 in addition to each alternator 21-23, in accordance with normal engine operation parameters optimized for generating marine propulsion. Each of the marine drives 11-13 is also configured to operate in a generator mode where the respective engine 16-18 is operated to just drive its associated alternator 21-23 to generate power while the shift system remains in a neutral position, and thus not rotating or engaging the propulsors 26-28, such as disclosed in U.S. Pat. No. 12,037,953, U.S. Patent Publication No. 2022/0014036, and U.S. application Ser. No. 18/082,323.

In one embodiment, the control system is configured to autonomously start the engines 16-18, such as to recharge the energy storage system 30 when the charge level thereof is below a threshold charge level. The control system may be configured to automatically start one or more of the engine(s) 16-18 while operating in an automatic start mode (which may be engaged, e.g., the key switch 51-53 being in an "generator control" position or in an accessory mode position), such as disclosed in U.S. Pat. No. 12,037,953. Namely, the control system may be configured to control the engines 16-18 such that the engines are not started when the vehicle is under the enclosure.

When operating in generator mode, the engine 16-18 is controlled in accordance with a set of generator parameters that optimize performance and output for charging a energy storage device 30. The control system may be configured to determine that a charge level of the energy storage device 30 is less than a threshold charge level (e.g., a state of charge value reported by the BMS 31 is less than a threshold SOC) and/or that the electrical load is greater than a threshold load and then, in response to determining that the marine vessel 1*a* is not under the enclosure based on the signal quality not being less than the signal quality threshold, start the generator to charge the energy storage device(s) 30. The charge level may be a voltage level of the energy storage device(s) 30, such as one or more batteries, or it may be a state of charge of the energy storage device(s) 30. In one embodiment, the control system is configured to start the generator(s) to charge the energy storage device 30 only if the marine vessel 1*a* is not under the enclosure.

The drive system 10 may further be configured to operate in various charging modes, each of which may be associated with a set of generator parameters. The drive system 10 may be configured to select one of the various charging modes based on user input or based on vessel conditions or factors, such as state of charge or vessel load amount. For example, the charging modes may include a fast charge mode where a set of generator parameters is configured to optimize engine output to charge the energy storage device(s) 30 as quickly as possible. Alternatively or additionally the charging modes may include a quiet mode or an efficiency mode where an associated set of generator parameters is configured to optimize system operation for minimizing noise and/or maximizing charging efficiency (such as charge output per unit fuel).

As used herein, the term "energy storage device" refers to any of various types of electrical energy storage devices utilized on a marine vessel for powering an electrical load, such as one or more lead-acid batteries and lithium-ion (LI) batteries. Further, the term "energy storage device" may refer to a single battery or battery pack or a plurality of batteries or battery packs, such as a battery bank. Thus, the energy storage device 30 may be a single battery, such as a single lead acid or lithium-ion battery, or may be a bank of such batteries. In the depicted example, the energy storage device 30 includes a battery management system (BMS) 31 configured to determine a charge level (such as a state of charge) and overall condition of the energy storage device 30. The BMS 31 may also be configured to monitor a charge output provided by one or more alternators 21-23 and power output to one or more power consuming devices on the marine vessel-together referred to herein as the vessel load 35. The BMS 31 is configured to communicate the charge level and load information within a control system 40, such as to a vessel power module (VPM) 45 configured to instruct and monitor generator mode operation.

The control system 40 includes one or more hardware controllers, such as propulsion control modules 41-43 configured to control the marine drive(s), a battery controller (BMS) 31, sensors, and user input elements communicatively connected together in order to effectuate system control. In the depicted example, the control system also includes a vessel power module (VPM) 45 communicatively connected to a propulsion control module (PCM) 41-43 for each of the respective marine drives 11-13 and also to the BMS 31. The various control elements are communicatively connected by communication link 49, such as a CAN bus. To provide one example, the communication link 49 may be effectuated as a CAN Kingdom Network. Alternatively, the communication link 49 may be a wireless communication network according to any of various wireless communication protocols. The control system 40 configuration illustrated in FIG. 2 is merely exemplary and other control system configurations are within the scope of the present disclosure, including varied number of controllers and types of controllers.

A user interface 48 is configured to receive user input and/or provide notifications and information to the user regarding the drive system 10 and/or the charging and energy storage operations, in particular. The user interface 48 may include, for example, a digital display and user input element, such as a touch screen, at the helm of the marine vessel 1*a*. For instance, the user interface 48 may be a display device, such as a Simrad Multifunction Display, and/or may comprise part of an on-board management system, such as a VesselView® system by Mercury Marine of Fond du Lac, Wisconsin. One or more helm control elements 47 may be configured to control throttle, shift, and steering of the marine drives 11-13. For example, the helm control elements 47 may include a throttle/shift lever for each of the marine drives 11-13, a steering wheel, a joystick, one or more trim switches for each of the marine drives 11-13, or the like. A key switch 51-53 for each marine drive 11-13 provides user control of starting and stopping the marine drives, and/or may also be used to engage the autonomous generator control mode where one or more of the engine(s) are started automatically following determination, as disclosed herein, that the vessel 1*a* is not under an enclosure. The position of each key switch 51-53 may be communicated directly to the VPM 45 or may be communicated indirectly via an intervening controller.

The control system 40 may be configured automatically start one or more of the marine drives 11-13 in the generator mode upon detection of a condition indicating that charging output is needed or preferable, referred to herein as a generator start condition. For example, detection of the generator start condition may be based on charge level, such as state of charge of the marine energy storage device 30 and/or detection of a threshold vessel load indicating high power consumption. Thus, the one or more marine drives 11-13 may be started in the generator mode upon detection of a low charge level (e.g., low state of charge) or upon detection of a large load demand, such as due to operation of one or more large load devices. Alternatively or additionally, the generator start condition may include detection of one or more user inputs, such as a user input to operate the system in generator mode to charge the energy storage device 30. For example, the user may have a preference to top-off the energy storage device 30 at a convenient time so that the generator mode does not kick on during an undesired time, such as at night or other quiet time. The system may be configured to receive a user input to engage the generator mode (e.g. a key switch position) or may be configured to operate the generator mode according to a user-set schedule.

The control system 40 is configured to utilize the GPS 60 to determine whether the marine vessel 1*a* is under an enclosure, and to disallow automatic start of one or more of the engines 16-18 in generator mode when the vessel 1*a* is under an enclosure. The global positioning receiver of the GPS 60 is operated to receive a global positioning signal from one or more satellites, identify a signal quality value of the global positioning signal, compare the signal quality value to a signal quality threshold, determine that the vehicle is under an enclosure if the signal quality is less than the signal quality threshold, and control each engine such that the engine is not started when the vehicle is under an enclosure. In one embodiment, the global positioning receiver outputs a signal quality indicator, wherein the signal quality indicator is used to determine the signal quality value. The signal quality indicator may include satellite IDs and/or signal strength characteristics, such as signal strength of each satellite signal from each satellite ID. The control system then identifies a signal quality value based on the signal quality indicator, such a number of satellites from which the global positioning signal is received and/or a signal strength characteristic of the various satellite signals. The signal strength characteristic may be a determined value representative of a plurality of global positioning signals received from a plurality of satellites. The control system 40 is further configured to compare the signal quality value to a threshold signal quality value and to determine whether the vessel 1*a* is under an enclosure based on that comparison, such as to compare a number of satellites from which the global positioning signal is received to a threshold number of satellites and/or compare a signal strength characteristic of the global positioning signal to a threshold signal strength characteristic.

Figure 3:
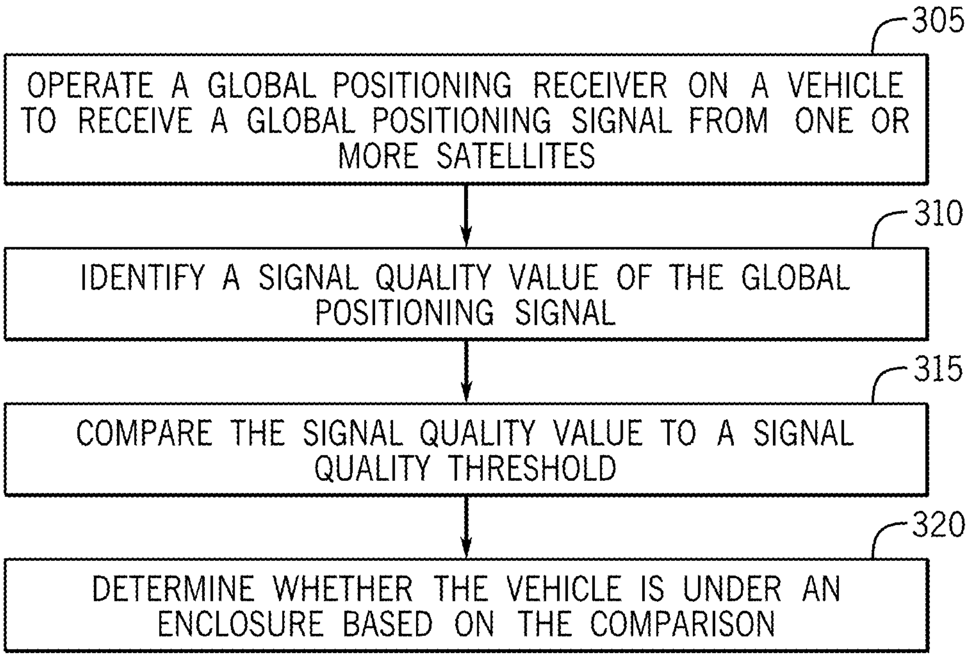
FIGS. 3-4 illustrate method steps of detecting a vehicle is under an enclosure according to embodiments of the present disclosure.

Referring to FIG. 3, exemplary method steps for detecting that a vehicle is under an enclosure are illustrated. At 305, a global positioning receiver on a vehicle is operated to receive a global positioning signal from one or more satellites. At 310, a signal quality value of the global positioning signal is identified by the control system. The signal quality value may be any value tied to the amount of satellite signals received, such as the number of satellites from which the global positioning signal is received, the signal strength, an average signal strength, a maximum signal strength, the lowest signal strength, or any combination of parameters, which will degrade significantly when the vehicle is under an enclosure. At 315, the signal quality value is compared to a signal quality threshold by the control system. The signal quality threshold may be defined by the characteristics of the signal quality value. In one embodiment, the control system compares a number of satellites from which the global positioning signal is received to a threshold number of satellites. Alternatively or additionally, a signal strength characteristic of the global positioning signal is compared to a threshold signal strength characteristic. The signal quality threshold may be a fixed value or a calibrated value, such as wherein the calibrated value is calibrated to detect a particular type of enclosure where the vehicle is often location or calibrated for a region where the vehicle is located. At 320, the control system determines whether the vehicle is under an enclosure based on the comparison.

Figure 4:
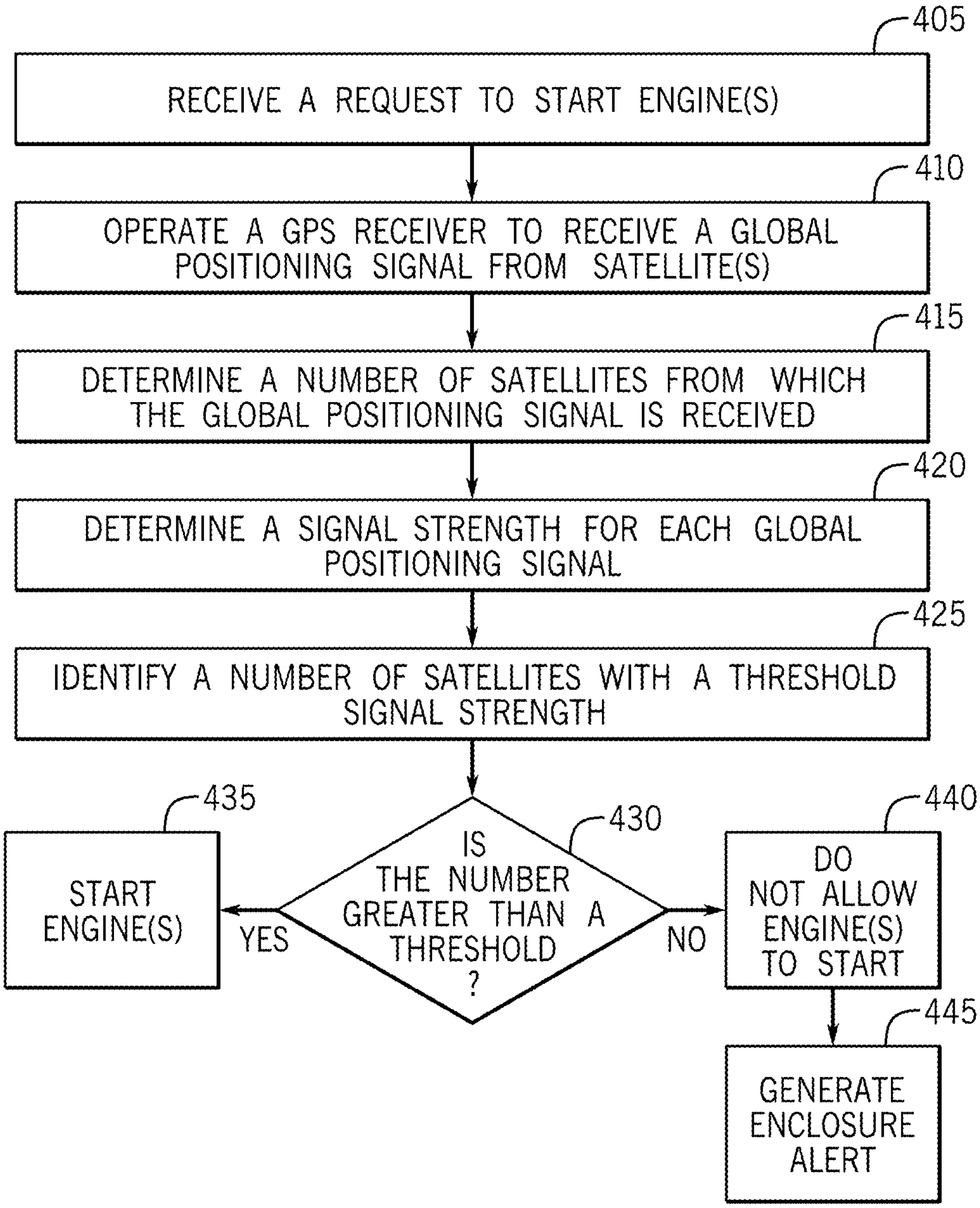

Referring to FIG. 4, exemplary method steps detecting a vehicle is under an enclosure are illustrated. At 405, the control system receives a request to start the engine(s). The request to start the engine(s) may be, for example, a request to start the engine(s) from a generator controller configured to operate in an automatic generator control mode to maintain charge level or power supply for vehicle accessories, as is described above. Alternatively or additionally, the enclosure check may be triggered at the time of engaging the automatic generator control mode or any mode or condition where a check for enclosure is appropriate.

At 410, the control system operates a GPS receiver to receive a global positioning signal from satellite(s). In one embodiment, the global positioning receiver is configured to output at least one signal quality indicator (in addition to position information), wherein the signal quality indicator may include satellite IDs of the satellites from which signals are received and/or signal strength characteristics, such as the signal strength of each satellite signal from each satellite ID. The signal strength characteristic(s) may be based on the signal strength of each received satellite signal, or signal strengths of some subset of the received satellite signals. At 415, the control system determines a number of satellites from which the global positioning signal is received. At 420, the control system determines a signal strength for each global positioning signal. The number of satellites and the respective signal strengths are then used to determine, at 425, a number of satellites with a threshold signal strength, which is a signal quality indicator. At 430, the number of satellites with a threshold signal strength is compared to a threshold number. If the threshold is exceeded, then the control system allows the engine(s) to start at step 430. If the threshold is not exceeded, then at 440, the control system does not allow the engine(s) to start. Where the engine(s) are not started in response to the start request, the control system generates an enclosure alert at step 445 to provide notification that the engine(s) were not started due to enclosure detection.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method of detecting that a vehicle is under an enclosure and controlling the vehicle accordingly, the method comprising:

- operating a global positioning receiver on a vehicle to receive a global positioning signal from one or more satellites;
- identifying a signal quality value of the global positioning signal;
- comparing the signal quality value to a signal quality threshold;
- determining that the vehicle is under an enclosure based on the comparison; and
- controlling operation of at least one system on the vehicle based on the vehicle being under the enclosure, including at least one of controlling the engine such that the engine is not started when the vehicle is under the enclosure, adjusting vehicle control based on magnetometer readings when the vehicle is under the enclosure, and controlling one or more actuators on the vessel to ensure that extendable devices are not extended when the vehicle is under the enclosure.

2. The method of claim 1, further comprising determining that the vehicle is under the enclosure if the signal quality value is less than the signal quality threshold.

3. The method of claim 1, wherein the signal quality value is based on at least one of a number of satellites from which the global positioning signal is received and/or a signal strength characteristic of the global positioning signal; and

- wherein the signal quality threshold is a threshold number of satellites and/or a threshold signal strength characteristic.

4. The method of claim 1, wherein comparing the signal quality value to the signal quality threshold includes comparing a number of satellites from which the global positioning signal is received to a threshold number of satellites.

5. The method of claim 1, wherein comparing the signal quality value to the signal quality threshold includes comparing a signal strength characteristic of the global positioning signal to a threshold signal strength characteristic.

6. The method of claim 5, wherein the signal strength characteristic is based on a plurality of global positioning signals received from a plurality of satellites.

7. The method of claim 1, wherein the signal quality threshold is a fixed value.

8. The method of claim 1, wherein the signal quality threshold is a calibrated value calibrated for a region where the vehicle is located.

9. A system for controlling an engine on a vehicle, the system comprising:

- a global positioning receiver on the vehicle configured to receive a global positioning signal from one or more satellites and output at least one signal quality indicator;
- a control system configured to:
  - identify a signal quality value of the global positioning signal based on the at least one signal quality indicator;
  - compare the signal quality value to a signal quality threshold;
  - determine whether the vehicle is under an enclosure based on the comparison; and
  - control the engine based on whether the vehicle is under the enclosure, including at least one of controlling the engine such that the engine is not started when the vehicle is under the enclosure, adjusting vehicle control based on magnetometer readings when the vehicle is under the enclosure, and controlling one or more actuators on the vessel to ensure that extendable devices are not extended when the vehicle is under the enclosure.

10. The system of claim 9, wherein the control system is further configured to determine that the vehicle is under the enclosure if the signal quality value is less than the signal quality threshold.

11. The system of claim 9, wherein the control system is further configured to control the engine such that the engine is not started when the vehicle is under the enclosure.

12. The system of claim 9, wherein the vehicle is a marine vessel and wherein the engine is a generator configured to charge at least one energy storage device on the marine vessel;

- wherein the control system is configured to start the generator to charge the energy storage device only if the marine vessel is not under the enclosure.

13. The system of claim 9, wherein the signal quality indicator includes a number of satellites from which the global positioning signal is received and/or at least one signal strength characteristic of the global positioning signal.

14. The system of claim 13, wherein the signal quality threshold is a threshold number of satellites and/or a threshold signal strength characteristic.

15. The system of claim 9, wherein the signal quality threshold is a threshold number of satellites with at least a threshold signal strength characteristic.

16. A method for controlling an engine on a vehicle, the method comprising:

- operating a global positioning receiver on a vehicle to receive a global positioning signal from one or more satellites;
- identifying a signal quality value of the global positioning signal;
- comparing the signal quality value to a signal quality threshold;

determining that the vehicle is under an enclosure if the signal quality value is less than the signal quality threshold; and controlling the engine such that the engine is not started when the vehicle is under the enclosure.

17. The method of claim 16, wherein the vehicle is a marine vessel and wherein the engine is a generator configured to charge at least one energy storage device on the marine vessel; the method further comprising:

determining that a charge level of the at least one energy storage device is less than a threshold charge level;

in response to determining that the marine vessel is not under the enclosure based on the signal quality value not being less than the signal quality threshold, start the generator to charge the energy storage device.

18. The method of claim 16, wherein the signal quality value is based on at least one of a number of satellites from which the global positioning signal is received and/or a signal strength characteristic of the global positioning signal; and wherein the signal quality threshold is a threshold number of satellites and/or a threshold signal strength characteristic.

19. The method of claim 18, further comprising comparing the number of satellites from which the global positioning signal is received to the threshold number of satellites.

20. The method of claim 18, further comprising comparing the signal strength characteristic of the global positioning signal to the threshold signal strength characteristic, wherein the signal strength characteristic is based on a plurality of global positioning signals received from a plurality of satellites.

* * * * *